United States Patent
Makino et al.

(10) Patent No.: US 10,126,033 B2
(45) Date of Patent: Nov. 13, 2018

(54) POWER CONVERSION DEVICE AND AIR CONDITIONER

(71) Applicant: Mitsubishi Electric Corporation, Tokyo (JP)

(72) Inventors: Yasushi Makino, Tokyo (JP); Keiichiro Shizu, Tokyo (JP); Kenta Owada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 211 days.

(21) Appl. No.: 15/030,397

(22) PCT Filed: Jan. 13, 2015

(86) PCT No.: PCT/JP2015/050626
§ 371 (c)(1),
(2) Date: Apr. 19, 2016

(87) PCT Pub. No.: WO2015/118906
PCT Pub. Date: Aug. 13, 2015

(65) Prior Publication Data
US 2016/0238300 A1      Aug. 18, 2016

(30) Foreign Application Priority Data

Feb. 5, 2014 (JP) ................. 2014-020707

(51) Int. Cl.
*F25B 49/02* (2006.01)
*F24F 1/20* (2011.01)
(Continued)

(52) U.S. Cl.
CPC ............. *F25B 49/025* (2013.01); *F24F 1/20* (2013.01); *F24F 1/40* (2013.01); *H02M 1/36* (2013.01);
(Continued)

(58) Field of Classification Search
CPC ................ F25B 49/025; F25B 2500/12; F25B 2600/02; F24F 1/20; F24F 1/40;
(Continued)

(56) References Cited

U.S. PATENT DOCUMENTS

2013/0152624 A1*  6/2013  Arisawa .............. H02M 1/4225
                                                    62/467
2015/0043257 A1*  2/2015  Nam ...................... H02H 9/002
                                                    363/53

FOREIGN PATENT DOCUMENTS

EP    2 816 296 A1   12/2014
JP    H04-98892 U    8/1992
(Continued)

OTHER PUBLICATIONS

Office Action dated Nov. 24, 2016 issued in corresponding AU patent application No. 2015214845.
(Continued)

*Primary Examiner* — Kevin J Comber
(74) *Attorney, Agent, or Firm* — Posz Law Group, PLC

(57) ABSTRACT

A power conversion device includes a first AC-DC conversion section generating DC voltage applied to a compressor drive section, a first DC-voltage smoothing section smoothing DC voltage, a first noise reduction section having one end connected to an AC power source and the other end connected to the first AC-DC conversion section, a second noise reduction section disposed between the first noise reduction section and the first AC-DC conversion section, an inrush-current inhibition circuit (a first inrush-current inhibition resistor and a rectifier diode) connected in parallel with the second noise reduction section and the first AC-DC conversion section for inhibiting inrush current from flowing to the first DC-voltage smoothing section, a first AC power-source relay opening/closing a power supply path to the inrush-current inhibition circuit, and a second AC power- (Continued)

source relay opening/closing a power supply path to the second noise reduction section.

7 Claims, 3 Drawing Sheets

(51) Int. Cl.
    *H02M 1/42*     (2007.01)
    *F24F 1/40*     (2011.01)
    *H02M 1/36*     (2007.01)
    *H02M 1/12*     (2006.01)
    *H02M 7/08*     (2006.01)
    *H02M 1/00*     (2006.01)

(52) U.S. Cl.
    CPC ....... *H02M 1/4208* (2013.01); *H02M 1/4225* (2013.01); *F25B 2500/12* (2013.01); *F25B 2600/02* (2013.01); *H02M 1/126* (2013.01); *H02M 7/08* (2013.01); *H02M 2001/0006* (2013.01); *Y02B 70/126* (2013.01)

(58) Field of Classification Search
    CPC .... H02M 1/36; H02M 1/4208; H02M 1/4225; H02M 1/126; H02M 7/08; H02M 2001/0006; Y02B 70/126
    USPC ........................................................ 361/93.7
    See application file for complete search history.

(56) References Cited

FOREIGN PATENT DOCUMENTS

| | | |
|---|---|---|
| JP | 2003-333847 A | 11/2003 |
| JP | 2009-038848 A | 2/2009 |
| JP | 2010-038484 A | 2/2010 |
| JP | 2010-263773 A | 11/2010 |
| JP | 4833168 B2 | 9/2011 |
| JP | 2011-223819 A | 11/2011 |
| JP | 2012-175882 A | 9/2012 |
| JP | 2013-031335 A | 2/2013 |
| JP | 5472333 B2 | 2/2014 |
| JP | 2014-075949 A | 4/2014 |
| JP | 2014-161195 A | 9/2014 |
| WO | 2013/094886 A1 | 6/2013 |

OTHER PUBLICATIONS

International Search Report of the International Searching Authority dated Mar. 10, 2015 for the corresponding international application No. PCT/JP2015/050626 (and English translation).
Extended European Search Report dated Sep. 6, 2017 issued in corresponding EP patent application No. 15746652.5.
Office Action dated Dec. 19, 2017 issued in corresponding CN patent application No. 201580002969.5 (and English translation).
Office Action dated Jun. 19, 2018 in the corresponding Chinese Patent Application No. 201580002969.5 (and English translation).

* cited by examiner

POWER CONVERSION DEVICE AND AIR CONDITIONER

CROSS REFERENCE TO RELATED APPLICATIONS

This application is a U.S. national stage application of International Patent Application No. PCT/JP2015/050626 filed on Jan. 13, 2015, which claims priority to Japanese Patent Application No. 2014-020707 filed on Feb. 5, 2014, the disclosures of which are incorporated herein by reference.

TECHNICAL FIELD

The present invention relates to a power conversion device and an air conditioner that includes the power conversion device.

BACKGROUND

Conventional air conditioners in which an outdoor unit and an indoor unit are operated by receiving AC power include a type in which AC power is fed to the outdoor unit and this type of air conditioner is in some cases configured such that two or more indoor units are connected to a single outdoor unit. Additionally, air conditioners have been proposed that restrict feeding of power to the outdoor unit during an operation standby period during which both the outdoor unit and the indoor unit are not operated.

For example, an air conditioner described in Patent Literature 1 achieves the transition of an outdoor unit to a low power consumption mode by separating a main circuit power source section and a sub power source section from a noise filter mounted on the outdoor unit, using a power feeding relay in the main circuit power source section, and providing an outdoor unit control section that opens and closes the power feeding relay and a sub power source that supplies power to the outdoor unit control section.

A power factor correction circuit is described in Patent Literature 2 that includes a rectifier circuit that performs DC conversion on the input voltage and a step-up chopper circuit that provides a voltage greater than the voltage that has undergone DC conversion; the power factor correction circuit is provided with a series circuit of a diode that allows a current to flow from the output of the rectifier circuit toward a smoothing capacitor and an inrush-current limiting resistor, thereby inhibiting an inrush current from flowing when the input voltage is applied.

Patent Literature

Patent Literature 1: Japanese Patent Application Laid-Open No. 2010-38484
Patent Literature 2: Japanese Patent Application Laid-Open No. 2011-223819

In the conventional air conditioner described in Patent Literature 1, the main power source section and the sub power source are separated from the noise filter mounted on the outdoor unit; therefore, there is a problem in that a reactive current flows at all times due to the effect of a normal noise removal filter (an across-the-line capacitor) mounted on the noise filter and thus reactive power cannot be eliminated even after the transition of the outdoor unit to the low power consumption mode.

Additionally, the sub power source section, which is separated from the main circuit power source section, is connected to a switching power source, which generates power for controlling actuators, such as a four-way valve and an electronic expansion valve, the outdoor unit control section, and the like with a rectified voltage from a smoothing capacitor. Hence, the voltage with which the smoothing capacitor is charged does not decrease by the loads such as the actuators; this creates the need to increase the capacitance of the smoothing capacitor for stabilized operation of the switching power source, thereby presenting a problem of increase in board footprint and cost.

The conventional power factor correction circuit described in Patent Literature 2 has no inrush-current limiting resistor that inhibits an inrush current from flowing into the step-up chopper circuit, which is composed of a reactor and a diode; this allows an inrush current to flow through both of a diode and a reactor connected to the output side of the rectifier circuit and an inrush current to flow also through the diode provided in the step-up chopper circuit, posing a problem that the diode may fail.

SUMMARY

The present invention has been achieved in view of the above, and an object of the present invention is to provide a power conversion device and an air conditioner that can achieve power saving. Another object of the present invention is to provide a power conversion device and an air conditioner that can achieve a reduction in size of a device and a reduction in cost.

In order to solve the above problems and achieve the object, an aspect of the present invention is a power conversion device for use in an outdoor unit of an air conditioner, the device including: an alternating current-direct current converter to convert an alternating-current voltage supplied from an alternating-current power source to generate a direct-current voltage to be applied to a compressor driver to operate a compressor; a direct-current-voltage smoother to smooth a direct-current voltage output from the alternating current-direct current converter; a first noise reducer having inductive reactance; a second noise reducer having capacitive reactance and disposed between the first noise reducer and the alternating current-direct current converter; an inrush-current inhibition circuit that inhibits an inrush current from flowing through the direct-current-voltage smoother; a first alternating-current power-source relay that opens and closes an alternating-current power supply path to the inrush-current inhibition circuit; and a second alternating-current power-source relay that opens and closes an alternating-current power supply path to the second noise reducer. A first path, on which the first noise reducer is located, is connected at one end to the alternating-current power source and is connected at another end to a second path, on which the second alternating-current power-source relay, the second noise reducer, and the alternating current-direct current converter are located. A third path, on which the first alternating-current power-source relay and the inrush-current inhibition circuit are located, is connected in parallel with the second path, and the first alternating-current power-source relay is located closer to the alternating-current power source than the inrush-current inhibition circuit.

The present invention produces effects of achieving a reduction in reactive power and thereby saving power by preventing a reactive current to flow through a second noise reduction section having capacitive reactance when there is no need to operate a compressor, such as during a standby operation. The present invention also produces an effect of

DETAILED DESCRIPTION

Exemplary embodiments of a power conversion device and an air conditioner according to the present invention will now be described in detail with reference to the drawings. The present invention is not limited to the embodiments.

First Embodiment

Figure 1:
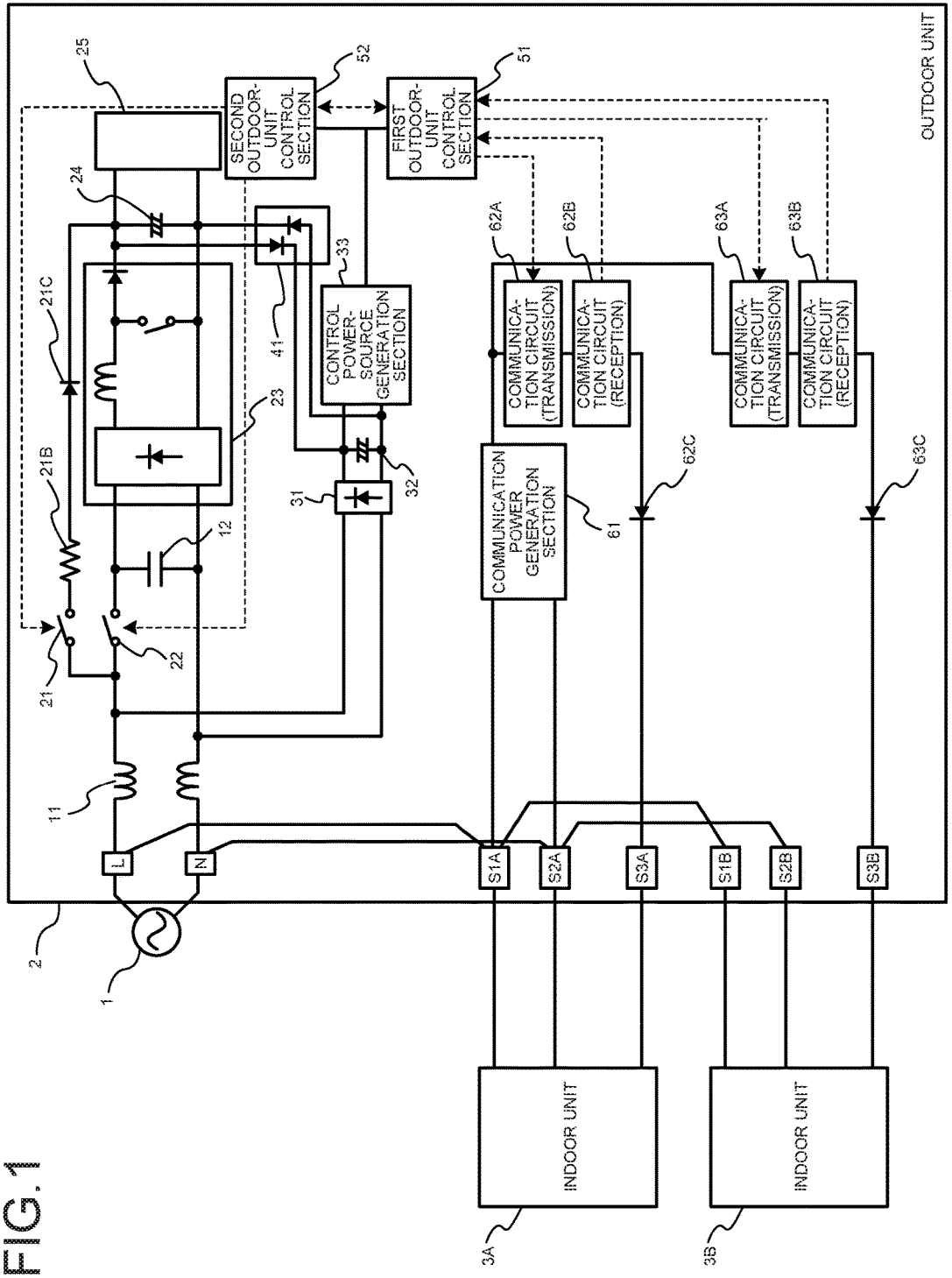
FIG. 1 is a diagram illustrating an exemplary configuration of an air conditioner according to a first embodiment.

FIG. 1 is a diagram illustrating an exemplary configuration of an air conditioner according to a first embodiment of the present invention. The air conditioner of the present embodiment includes an outdoor unit 2 and indoor units 3A and 3B. The outdoor unit 2 is connected to an AC power source 1 via terminals L and N. The indoor unit 3A is connected to the outdoor unit 2 via terminals S1A, S2A, and S3A and the indoor unit 3B is connected to the outdoor unit 2 via terminals S1B, S2B, and S3B. The terminal L is connected to the terminal S1A and the terminal S1B, the terminal N is connected to the terminal S2A and the terminal S2B, and the indoor units 3A and 3B receive power from the AC power source 1 via the outdoor unit 2. The exemplary configuration illustrated in FIG. 1 includes two indoor units connected to the outdoor unit 2, although the number of outdoor units is not limited to two.

The outdoor unit 2 includes two noise reduction sections, i.e., a first noise reduction section 11 and a second noise reduction section 12; two AC power-source relays, i.e., a first AC power-source relay 21 and a second AC power-source relay 22; a first inrush-current inhibition resistor 21B; a rectifier diode 21C; a first AC-DC conversion section 23, which includes a step-up chopper circuit; a first DC-voltage smoothing section 24; a compressor drive section 25, which drives a compressor (not illustrated) with power from the first DC-voltage smoothing section 24; a second AC-DC conversion section 31; a second DC-voltage smoothing section 32; a control power-source generation section 33, which generates power from a DC voltage from the second DC-voltage smoothing section 32; a diode rectifier section 41, which connects the first DC-voltage smoothing section 24 to the second DC-voltage smoothing section 32; two control sections, i.e., a first outdoor-unit control section 51 and a second outdoor-unit control section 52, which control the operation of the outdoor unit 2 by using the power received from the control power-source generation section 33; a communication power-source generation section 61, which generates power to be supplied to the circuits that perform communication between the indoor units 3A and 3B to operate the air conditioner; communication circuits 62A, 62B, 63A, and 63B that perform communication between the outdoor unit 2 and the indoor units 3A and 3B; and diodes 62C and 63C.

Note that the first noise reduction section 11, the second noise reduction section 12, the first AC power-source relay 21, the second AC power-source relay 22, the first inrush-current inhibition resistor 21B, the rectifier diode 21C, the first AC-DC conversion section 23, the first DC-voltage smoothing section 24, the compressor drive section 25, the second AC-DC conversion section 31, the second DC-voltage smoothing section 32, the control power-source generation section 33, the diode rectifier section 41, the first outdoor-unit control section 51, and the second outdoor-unit control section 52 constitute a power conversion device. The communication circuits 62A and 63A are circuits that transmit communication signals and the communication circuits 62B and 63B are circuits that receive communication signals; these communication circuits operate by receiving DC power generated by the communication power-source generation section 61.

The operation of the air conditioner according to the present embodiment will be described below.

When the outdoor unit 2 receives power from the AC power source 1, the second DC-voltage smoothing section 32 is energized through the second AC-DC conversion section 31 such that a DC voltage is generated. The DC voltage is fed to the control power-source generation section 33, which generates power to be fed to the first outdoor-unit control section 51 and the second outdoor-unit control section 52.

When the indoor units 3A and 3B are not operated, there is no need to supply power to the compressor drive section 25 because the compressor (not illustrated) is not operated. In this case, there is no need to supply power to the first DC-voltage smoothing section 24 via the first AC-DC conversion section 23; thus, the contacts of the first AC power-source relay 21 and the second AC power-source relay 22, which are disposed on the paths to the first DC-voltage smoothing section 24, are both open. The contacts of the first AC power-source relay 21 and the second AC power-source relay 22 are controlled by the second outdoor-unit control section 52.

The first noise reduction section 11 has inductive reactance and includes, for example, a solenoid-like coil having an inductance component. The second noise reduction section 12 has capacitive reactance and includes, for example, a capacitor having a capacitance component. The AC power source 1 is applied across the second noise reduction section 12. The second AC power-source relay 22 is connected between the first noise reduction section 11 and the second noise reduction section 12. A junction of the path to the first AC-DC conversion section 23 and the path to the second AC-DC conversion section 31 is placed between the first noise reduction section 11 and the contact of the second AC power-source relay 22.

Application of the voltage of the AC power source 1 across the second noise reduction section 12 generates reactive power because the second noise reduction section 12 has the capacitive reactance, and hence a current that supplies the reactive power from the AC power source 1 to the second noise reduction section 12 is generated at the first noise reduction section 11. Here, the second outdoor-unit control section 52 controls the first AC power-source relay 21 and the second AC power-source relay 22 such that their contacts are open.

As a result, the energization of the first noise reduction section 11 is maintained, while the energization of the second noise reduction section 12 is prevented. Thus, no reactive power is generated at the second noise reduction section 12, and a current that supplies the reactive power does not flow.

Meanwhile, feeding of the power to the second DC-voltage smoothing section 32 and the operation of the first outdoor-unit control section 51 are maintained because the power supply path to the second AC-DC conversion section 31 branches off between the first noise reduction section 11 and the contact of the second AC power-source relay 22. Here, by the action of the first noise reduction section 11, noise generated at the control power-source generation section 33 can be inhibited from flowing out to the AC power source 1. Note that the second AC-DC conversion section 31, the second DC-voltage smoothing section 32, and the control power-source generation section 33 constitute a control DC-voltage generation section.

Inclusion of the diode rectifier section 41 in the outdoor unit 2 allows prevention of feeding of power from the second DC-voltage smoothing section 32 to the first DC-voltage smoothing section 24 when the DC voltage of the first DC-voltage smoothing section 24 is lower than that of the second DC-voltage smoothing section 32.

When no power is supplied to the first DC-voltage smoothing section 24, no DC voltage is generated; thus, the DC voltage of the first DC-voltage smoothing section 24 is lower than that of the second DC-voltage smoothing section 32. However, as described above, the diode rectifier section 41 prevents the power from the second DC-voltage smoothing section 32 from being fed to the first DC-voltage smoothing section 24; therefore, the first DC-voltage smoothing section 24 does not consume the power.

The condition under which the need for feeding power to the compressor drive section 25 is eliminated is not limited to when the indoor units 3A and 3B are not operated; even when the indoor units 3A and 3B are being operated, no operation of the compressor may be necessary depending on the operation modes of the indoor units 3A and 3B and their ambient environment. Even in such a case, the air conditioner according to the present embodiment can of course achieve a reduction in power consumption during an operation standby period.

The first outdoor-unit control section 51 and the second outdoor-unit control section 52 perform transmission/reception communication at all times to monitor the state of the outdoor operation. Here, because only the state of the outdoor operation is monitored, it allows the power consumption of the operations of the first outdoor-unit control section 51 and the second outdoor-unit control section 52 to be low.

When the need arises to feed power to the compressor drive section 25 to operate the compressor, the second outdoor-unit control section 52 controls the first AC power-source relay 21 such that its contact is closed. The closing of the first AC power-source relay 21 allows a charging current to flow to the first DC-voltage smoothing section 24 via the contact of the first AC power-source relay 21, the first inrush-current inhibition resistor 21B, and the rectifier diode 21C (an inrush-current inhibition circuit), causing the voltage of the first DC-voltage smoothing section 24 to be lower than that of the second DC-voltage smoothing section 32 by the forward voltage Vf of the diode rectifier section 41. The first DC-voltage smoothing section 24 is formed of a smoothing capacitor ten or more times as large as that of the second DC-voltage smoothing section 32 to provide a voltage required to operate the compressor.

Here, by the action of the first inrush-current inhibition resistor 21B, an inrush current flowing to the first DC-voltage smoothing section 24 is inhibited. Because of the contact of the second AC power-source relay 22 being open, the DC voltage can be fed to the first DC-voltage smoothing section 24 without allowing the charging current to flow through the step-up chopper circuit of the first AC-DC conversion section 23. This can prevent the step-up chopper circuit of the first AC-DC conversion section 23 from failing due to an inrush current.

The step-up chopper circuit may include a semiconductor device formed of a wide band-gap semiconductor, such as Si, SiC, GaN, and diamond. A switching element and a diode element formed of a wide band-gap semiconductor have high withstand voltages and high allowable current densities and thus can achieve a reduction in size of the switching element and the diode element and thereby a reduction in size of a device. They also have high heat resistances and thus can achieve a reduction in size of, for example, a radiation fin of a heat sink, and thereby a further reduction in size of the device. Furthermore, they have low power losses and thus can achieve an increase in efficiency of the switching element and the diode element and thereby an increase in power conversion efficiency and power saving. Every switching element and diode element is desirably formed of a wide band-gap semiconductor, although only some of the elements may be formed of a wide band-gap semiconductor, which still produces such effects as achievement of a reduction in size of a device and an increase in efficiency of the device.

After closing the contact of the first AC power-source relay 21, the second outdoor-unit control section 52 monitors (not illustrated) the voltage of the first DC-voltage smoothing section 24 and, when it detects the voltage being equal to or greater than a predetermined voltage, closes the contact of the second AC power-source relay 22 and opens the contact of the first AC power-source relay 21. This starts the feeding of power to the first AC-DC conversion section 23, which converts the AC voltage fed from the AC power source 1 to a desired DC voltage and feeds it to the compressor drive section 25. Upon reception of the power from the first AC-DC conversion section 23, the compressor drive section 25 activates the compressor such that the air conditioner starts its normal operation. The step-up chopper circuit of the first AC-DC conversion section 23 is controlled by, for example, the second outdoor-unit control section 52.

The first outdoor-unit control section 51 and the second outdoor-unit control section 52 receive the power generated by the control power-source generation section 33 even in the operation standby period and monitor the outdoor state at all times. This enables the second outdoor-unit control section 52 to be maintained in a readily operable state such that it can respond to a command from the first outdoor-unit control section 51 and thus causes the activation time needed by the compressor to be only the time taken to operate the relays, thereby achieving quick activation of the compressor.

The inclusion of the diode rectifier section 41 enables the control power-source generation section 33 to operate with the second DC-voltage smoothing section 32 charged with the charging current flowing via the first DC-voltage smoothing section 24. Using the first DC-voltage smoothing section 24 formed of the smoothing capacitor ten or more times as large as that of the second DC-voltage smoothing section 32 enables the first DC-voltage smoothing section 24 to maintain a constant voltage for the second DC-voltage smoothing section 32 at all times. This allows the smoothing capacitor forming the second DC-voltage smoothing section 32 to have a minimum capacitance enough to operate only at the activation of the outdoor unit 2 and thereby a reduction in size and cost.

As described above, in the air conditioner according to the present embodiment, the second outdoor-unit control section 52 operates by using the power received from the control power-source generation section 33 and, when there is no need to operate the compressor, opens the contacts of the first AC power-source relay 21 and the second AC power-source relay 22 and, when the compressor is to be activated, closes the contact of the first AC power-source relay 21, which is on the path on which the first inrush-current inhibition resistor 21B is disposed, waits for a certain time until the voltage across the smoothing capacitor (the first DC-voltage smoothing section 24) connected to the output side of the first AC-DC conversion section 23 reaches a predetermined value, and, then, closes the contact of the second AC power-source relay 22, which is placed on the feeding path from the AC power source 1 to the first AC-DC conversion section 23, and opens the contact of the first AC power-source relay 21. This prevents reactive current from flowing through the second noise reduction section 12, which has capacitive reactance, when there is no need to operate the compressor, such as during a standby operation (in the operation standby period) and thereby achieves a reduction in reactive power. This can also inhibit an inrush current from flowing into the first AC-DC conversion section 23 when the compressor is activated and thereby prevent the diode included in the first AC-DC conversion section 23 from failing. Additionally, this can restrict the power consumed by the first AC power-source relay 21 and improve the quality of the first AC-DC conversion section 23. Furthermore, this enables a reduction in power consumption during the normal operation.

Second Embodiment

As described above, the air conditioner according to the first embodiment prevents an excessive inrush current from flowing through the first AC-DC conversion section 23 when the compressor is activated. Because the application of the AC voltage to the second AC-DC conversion section 31 is maintained even when the compressor is being stopped, it is unlikely that an inrush current flows into the second AC-DC conversion section 31 when the compressor is activated. However, when the supply of the power from the AC power source 1 to the outdoor unit 2 is started, that is, when the outdoor unit 2 receives the power from the AC power source 1 to cause the second AC-DC conversion section 31 to start the operation to generate the DC voltage to be applied to the second DC-voltage smoothing section 32, an inrush current flows through the second DC-voltage smoothing section 32. An excessive inrush current flowing through the second AC-DC conversion section 31 may cause the second AC-DC conversion section 31 to fail; thus, it is necessary to inhibit an inrush current caused when the second AC-DC conversion section 31 starts the operation in order to achieve a reduction in size of the second AC-DC conversion section 31.

Figure 2:
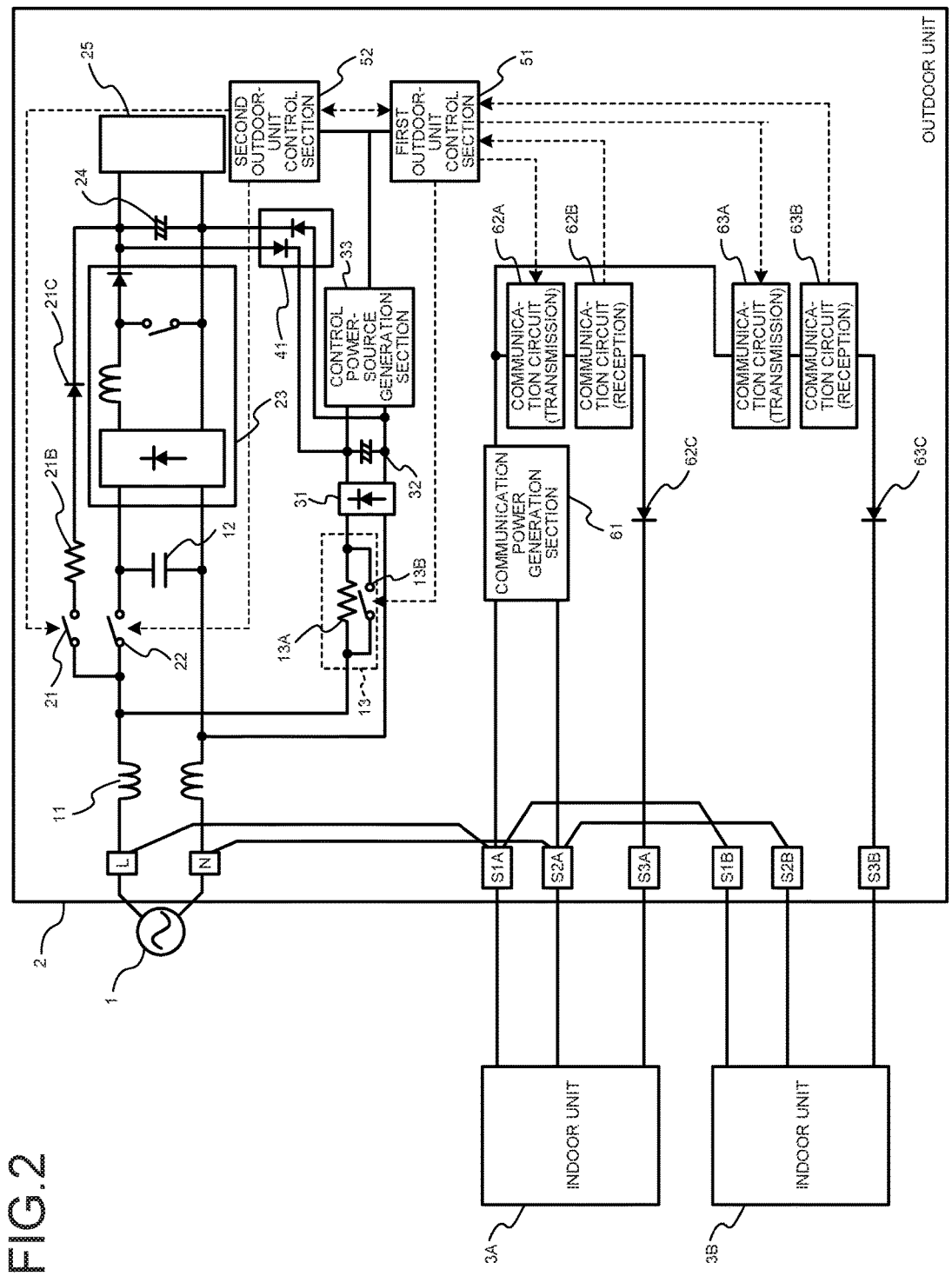
FIG. 2 is a diagram illustrating an exemplary configuration of an air conditioner according to a second embodiment.

FIG. 2 is a diagram illustrating an exemplary configuration of an air conditioner according to a second embodiment. As illustrated in FIG. 2, the air conditioner according to the present embodiment includes, in addition to the components of the air conditioner according to the first embodiment (see FIG. 1), an inrush-current inhibition section 13, which includes a second inrush-current inhibition resistor 13A and an inrush-current inhibition relay 13B. Components designated with identical symbols to those in FIG. 1 are common to those of the air conditioner according to the first embodiment. The inrush-current inhibition section 13 is disposed between the second AC-DC conversion section 31 and the first noise reduction section 11. The contact of the inrush-current inhibition relay 13B is controlled by the first outdoor-unit control section 51 and is open when the first outdoor-unit control section 51 receives no power and does not operate.

The operation will be described below. Only differences from the air conditioner according to the first embodiment will be described.

Upon reception of power by the outdoor unit 2 from the AC power source 1, a DC voltage is applied to the second DC-voltage smoothing section 32 through the inrush-current inhibition section 13 and the second AC-DC conversion section 31. Here, an inrush current flows through the second inrush-current inhibition resistor 13A; thus, the peak value of the inrush current is restricted so that no excessive current flows through the second AC-DC conversion section 31.

The DC voltage smoothed by the second DC-voltage smoothing section 32 is fed to the control power-source generation section 33, which generates power to be fed to the first outdoor-unit control section 51 and the second outdoor-unit control section 52. This causes the first outdoor-unit control section 51 and the second outdoor-unit control section 52 to start operating. Upon starting operating, the first outdoor-unit control section 51 causes the contact of the inrush-current inhibition relay 13B to achieve a short circuit so that the charging current flowing to the second DC-voltage smoothing section 32 through the second inrush-current inhibition resistor 13A changes the path to flow to the contact of the inrush-current inhibition relay 13B, which has a lower resistance value.

Because of the change of the path to flow through the contact of the inrush-current inhibition relay 13B, power is no longer consumed in the second inrush-current inhibition resistor 13A, which has a higher resistance value, and this enables a reduction in power consumption of the outdoor unit 2.

The air conditioner according to the present embodiment includes the inrush-current inhibition section 13 in addition to the configuration of the air conditioner described in the first embodiment in the manner described above and thus can prevent an excessive current from flowing through the second AC-DC conversion section 31, thereby enabling a reduction in size of the second AC-DC conversion section 31. Additionally, the inrush-current inhibition relay 13B is provided such that the path of the charge current flowing to the second DC-voltage smoothing section 32 through the second inrush-current inhibition resistor 13A is changed to flow through the contact of the inrush-current inhibition relay 13B at a point in time when a certain time period elapses after the second AC-DC conversion section 31 starts operating; this allows the second inrush-current inhibition resistor 13A to not consume the power and thereby achieves a reduction in power consumption of the outdoor unit 2.

Third Embodiment

Figure 3:
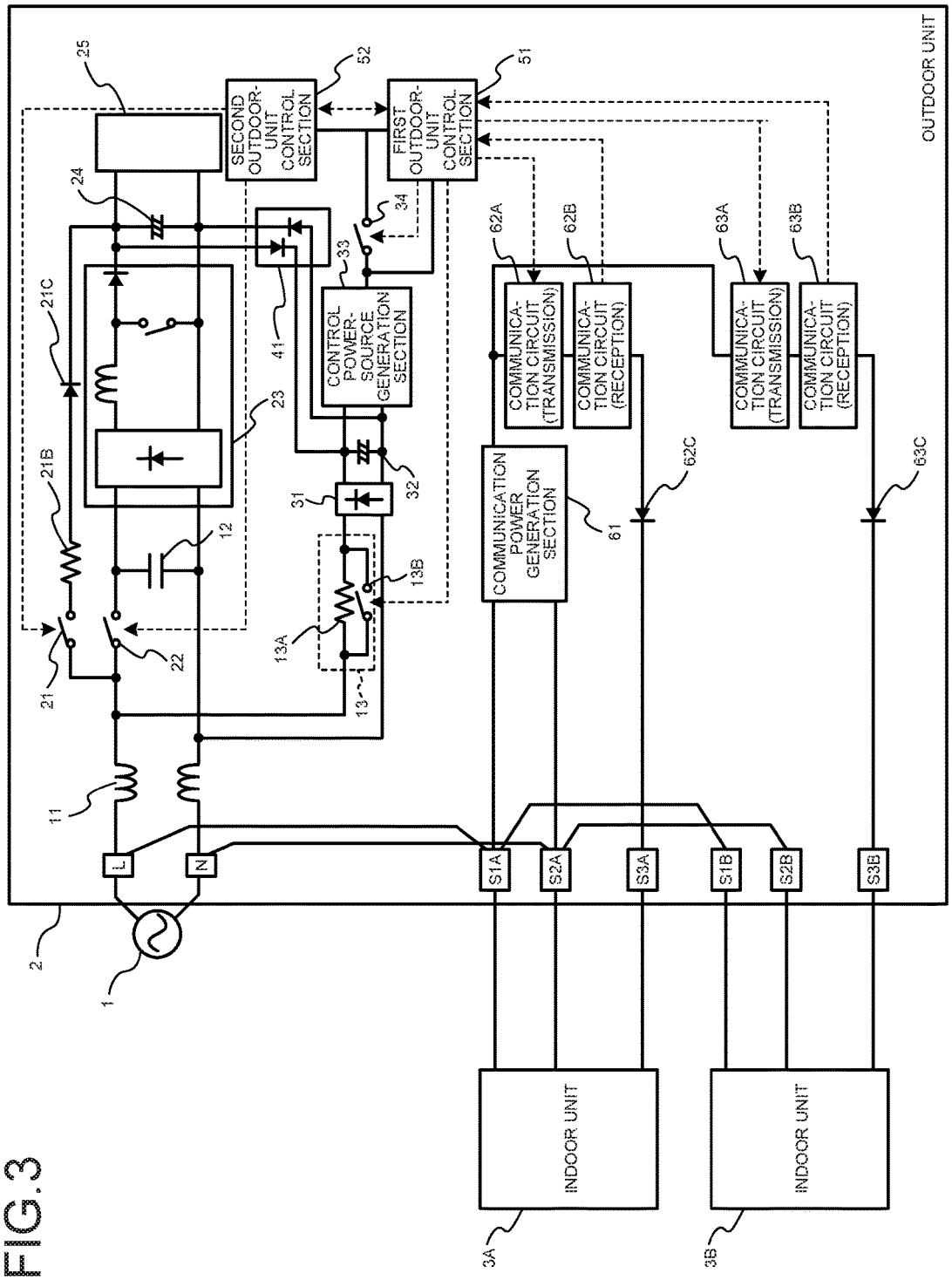
FIG. 3 is a diagram illustrating an exemplary configuration of an air conditioner according to a third embodiment.

FIG. 3 is a diagram illustrating an exemplary configuration of an air conditioner according to a third embodiment. As illustrated in FIG. 3, the air conditioner according to the present embodiment includes, in addition to the components of the air conditioner according to the second embodiment (see FIG. 2), a power source control relay 34, which controls the supply of the power generated by the control power-source generation section 33 to the second outdoor-unit control section 52. Components designated with identical symbols to those in FIG. 2 are common to those of the air conditioner according to the second embodiment.

The operation will be described below. Only differences from the air conditioners according to the first and second embodiments will be described.

When the indoor units 3A and 3B are not operated, there is no need to supply power to the compressor drive section 25 because the compressor (not illustrated) is not operated. In this case, no power is supplied also to the first DC-voltage smoothing section 24 via the first AC-DC conversion section 23; thus, the contacts of the first AC power-source relay 21 and the second AC power-source relay 22, which are disposed on the path to the first DC-voltage smoothing section 24, are both open.

When no power is supplied to the first DC-voltage smoothing section 24, no DC voltage is generated; thus, the DC voltage of the first DC-voltage smoothing section 24 is lower than that of the second DC-voltage smoothing section 32. Here, the diode rectifier section 41 preventing the feeding of the power from the second DC-voltage smoothing section 32 to the first DC-voltage smoothing section 24 allows the first DC-voltage smoothing section 24 to not consume the power.

Because the contacts of the first AC power-source relay 21 and the second AC power-source relay 22 are controlled by the second outdoor-unit control section 52, there is no need to feed the power to the second outdoor-unit control section 52 when the contacts of the first AC power-source relay 21 and the second AC power-source relay 22 may remain open. Hence, while the indoor units 3A and 3B are not operated, the first outdoor-unit control section 51 can open the contact of the power source control relay 34 to shut off the feeding of the power to the second outdoor-unit control section 52 so that the second outdoor-unit control section 52 does not consume the power.

The air conditioner according to the present embodiment further includes the power source control relay 34 in the manner described above. When there is no need to feed power to the first DC-voltage smoothing section 24, the diode rectifier section 41 prevents the feeding of the power from the second DC-voltage smoothing section 32 to the first DC-voltage smoothing section 24, and the first outdoor-unit control section 51 opens the contact of the power source control relay 34 to shut off the feeding of the power to the second outdoor-unit control section 52. This allows the first DC-voltage smoothing section 24 and the second outdoor-unit control section 52 to not consume the power and thereby enables a reduction in power consumption of the outdoor unit 2 in the operation standby period.

The addition of the power source control relay 34 to the air conditioner according to the second embodiment has been described above, although the power source control relay 34 can be added to the air conditioner according to the first embodiment to produce similar effects.

In the case of exclusion of the power source control relay 34, that is, in the case of the air conditioner according to the first and second embodiments, the first outdoor-unit control section 51 and the second outdoor-unit control section 52 may be united to form a unitary outdoor unit control section, instead of using the separate sections.

INDUSTRIAL APPLICABILITY

As described above, the power conversion device according to the present invention is useful as a power conversion device to be included in an outdoor unit of an air conditioner.

The invention claimed is:
1. A power conversion device for use in an outdoor unit of an air conditioner, the device comprising:
   an alternating current-direct current converter to convert an alternating-current voltage supplied from an alternating-current power source to generate a direct-current voltage to be applied to a compressor driver to operate a compressor;
   a direct-current-voltage smoother to smooth a direct-current voltage output from the alternating current-direct current converter;
   a first noise reducer having inductive reactance;
   a second noise reducer having capacitive reactance and disposed between the first noise reducer and the alternating current-direct current converter;
   an inrush-current inhibition circuit that inhibits an inrush current from flowing through the direct-current-voltage smoother;
   a first alternating-current power-source relay that opens and closes an alternating-current power supply path to the inrush-current inhibition circuit; and
   a second alternating-current power-source relay that opens and closes an alternating-current power supply path to the second noise reducer, wherein:
   a first path, on which the first noise reducer is located, is connected at one end to the alternating-current power source and is connected at another end to a second path, on which the second alternating-current power-source relay, the second noise reducer, and the alternating current-direct current converter are located,
   a third path, on which the first alternating-current power-source relay and the inrush-current inhibition circuit are located, is connected in parallel with the second path,
   the first alternating-current power-source relay is located closer to the alternating-current power source than the inrush-current inhibition circuit,
   the power conversion device further comprises:
     a controller to control the first alternating-current power-source relay and the second alternating-current power-source relay;
     a control direct-current-voltage generator to convert an alternating-current voltage supplied from the alternating-current power source to generate a direct-current voltage to be applied to the controller;
     an inrush-current inhibition resistor that inhibits an inrush current from flowing through the control direct-current-voltage generator; and
     an inrush-current inhibition relay that is connected in parallel with the inrush-current inhibition resistor and opens and closes a path connecting both ends of the inrush-current inhibition resistor, and
   the inrush-current inhibition relay opens a contact of the inrush-current inhibition relay when feeding of power from the alternating-current power source is stopped, and closes the contact at a point in time when a certain time elapses after the feeding of the power from the alternating-current power source is started.
2. The power conversion device according to claim 1, wherein:
   when it is unnecessary to operate the compressor, contacts of both the first alternating-current power-source relay and the second alternating-current power-source relay are open and,
   when the compressor is to start operating, the contact of the first alternating-current power-source relay is closed and, then,
   after elapse of a certain time period, the contact of the second alternating-current power-source relay is closed and the contact of the first alternating-current power-source relay is opened.

3. The power conversion device according to claim 1, further comprising
a power source control relay that opens a direct-current power supply path from the control direct-current-voltage generator to the controller when it is unnecessary to operate the compressor.

4. The power conversion device according to claim 1, wherein:
the control direct-current-voltage generator comprises:
a power converter to convert an alternating-current voltage supplied from the alternating-current power source to a direct-current voltage; and
a control power-source generator to receive a direct-current voltage from the power converter and generate power to be supplied to the controller, and
a direct-current voltage supply path is provided to connect the control direct-current-voltage generator and the alternating current-direct current converter and supply a direct-current voltage output from the alternating current-direct current converter to the control power-source generator when the compressor is being operated.

5. The power conversion device according to claim 4, wherein
the direct-current voltage supply path is provided with a diode rectifier to prevent supply of a direct-current voltage output from the power converter to a side of the diode rectifier on which the compressor driver is located when a direct-current voltage is not output from the alternating current-direct current converter.

6. The power conversion device according to claim 1, wherein
the alternating current-direct current converter is formed of a wide band-gap semiconductor element.

7. An air conditioner comprising the power conversion device according to claim 1.

* * * * *